US011070350B1

(12) United States Patent
Min

(10) Patent No.: US 11,070,350 B1
(45) Date of Patent: Jul. 20, 2021

(54) ELECTRONIC DEVICE AND OPERATING METHOD OF ELECTRONIC DEVICE

(71) Applicant: Samsung Electronics Co., Ltd., Suwon-si (KR)

(72) Inventor: Woongki Min, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/990,068

(22) Filed: Aug. 11, 2020

(30) Foreign Application Priority Data

Jan. 6, 2020 (KR) ........................ 10-2020-0001624

(51) Int. Cl.
*H04L 7/00* (2006.01)
*H04L 7/033* (2006.01)

(52) U.S. Cl.
CPC .......... *H04L 7/0041* (2013.01); *H04L 7/0337* (2013.01)

(58) Field of Classification Search
CPC ........................... H04L 7/0041; H04L 7/0337
See application file for complete search history.

(56) References Cited

U.S. PATENT DOCUMENTS

| | | | | |
|---|---|---|---|---|
| 9,130,735 | B2 | 9/2015 | Lee et al. | |
| 9,246,666 | B2 | 1/2016 | Kil | |
| 9,319,218 | B2 | 4/2016 | Pandey et al. | |
| 9,473,291 | B2 | 10/2016 | Kil | |
| 9,722,590 | B1 | 8/2017 | Usugi et al. | |
| 9,735,950 | B1 * | 8/2017 | Liu | H04L 7/0331 |
| 9,866,413 | B2 * | 1/2018 | Chang | G06F 13/4278 |
| 10,128,964 | B2 * | 11/2018 | Wiley | H04B 17/21 |
| 10,148,414 | B2 | 12/2018 | Lugthart et al. | |
| 10,243,614 | B1 | 3/2019 | Ulrich et al. | |
| 10,284,361 | B2 | 5/2019 | Chiueh et al. | |
| 10,289,600 | B2 | 5/2019 | Sejpal et al. | |
| 10,419,246 | B2 | 9/2019 | Duan et al. | |
| 10,469,214 | B1 * | 11/2019 | Dudulwar | H04L 1/205 |
| 10,630,295 | B2 * | 4/2020 | Seno | H03K 19/20 |
| 2015/0280896 | A1 * | 10/2015 | Kil | H04L 25/14 375/362 |
| 2017/0195111 | A1 | 7/2017 | Takahashi | |
| 2018/0019863 | A1 * | 1/2018 | Liao | H04L 7/04 |
| 2019/0188159 | A1 | 6/2019 | Song et al. | |
| 2019/0273638 | A1 | 9/2019 | Seno | |
| 2020/0358432 | A1 * | 11/2020 | Wysocki | H03H 7/325 |

* cited by examiner

*Primary Examiner* — Freshteh N Aghdam
(74) *Attorney, Agent, or Firm* — Harness, Dickey & Pierce, P.L.C.

(57) ABSTRACT

An electronic device includes processing circuitry outputting first to third signals, delaying first to third signals to output fourth to sixth signals, generating a pulse signal based on the fourth signal, the fifth signal, and the sixth signal, detecting lengths of intervals, and adjusting at least one of a first code, a second code, and a third code based on fourth codes.

20 Claims, 15 Drawing Sheets

200
290
Signal Processor
RS1
RS2
RS3
OP
250
Unit Interval Detector
260
Skew Calibration Logic
CD4
CD5
280
Data Recovery Circuit
CLK
270
Clock Recovery Circuit
240
Pulse Generator
P
SEL
CD1
CD2
CD3
S4
S5
S6
DL1
DL2
DL3
S1
S2
S3
210
220
230
211
221
231
Lane
SL1
SL2
SL3
100
121
131
141
120
130
140
110
Signal Generator 1000
1260
1262
1264
WIMAX
WLAN
UWB
1240
Application Processor
1100
RF Chip
1270
Speaker
1246
1242
1244
1150
DigRF Master
1110
PHY
MIPI DigRF
PHY
DigRF Slave
1275
MIC
1140
UFS HCI
1255
Embedded/ Card Storage
DSI Host
1120
CSI Host
GPS
1280
SER
1130
DES
1250
Working Memory
Bridge Chip
1290
Display Serial Interface
Camera Serial Interface
DES
SER
1225
DSI Device
1235
CSI Device
1220
Display
1230
Image Sensor

ELECTRONIC DEVICE AND OPERATING METHOD OF ELECTRONIC DEVICE

CROSS-REFERENCE TO RELATED APPLICATIONS

This application claims priority under 35 U.S.C. § 119 to Korean Patent Application No. 10-2020-0001624 filed on Jan. 6, 2020, in the Korean Intellectual Property Office, the disclosures of which are incorporated by reference herein in their entireties.

BACKGROUND

Example embodiments of the inventive concepts described herein relate to an electronic device, and more particularly, relate to an electronic device recovering a clock signal from data including an embedded clock.

Various protocols are being used and developed to communicate data between different devices. Nowadays, C-PHY is being developed as one of the protocols. The C-PHY is characterized in that a separate clock signal is not exchanged between different devices.

A transmitter of the C-PHY may combine data signals and an embedded clock and may transmit the combined signals. A receiver of the C-PHY is configured to recover a clock signal from the received signals and to recover data from the received signals by using the clock signal.

The receiver of the C-PHY does not receive a separate clock signal. Accordingly, the receiver of the C-PHY fails to calibrate a skew while sweeping transition timings of a data signal and a clock signal.

SUMMARY

Example embodiments of the inventive concepts provide a C-PHY-based electronic device detecting and calibrating a skew from received signals and an operating method of the electronic device.

According to example embodiments, an electronic device includes processing circuitry configured to receive a signal of a first signal line and a signal of a second signal line and outputs a difference between the signal of the first signal line and the signal of the second signal line as a first signal, receive the signal of the second signal line and a signal of a third signal line and output a difference between the signal of the second signal line and the signal of the third signal line as a second signal, receive the signal of the third signal line and the signal of the first signal line and output a difference between the signal of the third signal line and the signal of the first signal line as a third signal, receive the first signal, adjust a first delay amount in response to a first code, and output a fourth signal by delaying the first signal as much as the first delay amount, receive the second signal, adjust a second delay amount in response to a second code, and output a fifth signal by delaying the second signal as much as the second delay amount, receive the third signal, adjust a third delay amount in response to a third code, and output a sixth signal by delaying the third signal as much as the third delay amount, generate a pulse signal based on the fourth signal, the fifth signal, and the sixth signal, detect lengths of intervals of the pulse signal, which have a high level, and output fourth codes indicating the lengths of the intervals, respectively, and adjust at least one of the first code, the second code, and the third code based on the fourth codes.

According to example embodiments, an electronic device includes processing circuitry configured to output a first signal, a second signal, and a third signal, detect differences of time lengths of intervals between transition timings of the first signal, the second signal, and the third signal and generates a fourth signal, a fifth signal, and a sixth signal by delaying at least one of the first signal, the second signal, and the third signal such that the differences of the time lengths decrease, while the first signal, the second signal, and the third signal alternately transition during a preamble interval, and recover a clock signal, and a first receive signal, a second receive signal, and a third receive signal by using the fourth signal, the fifth signal, and the sixth signal.

According to example embodiments, an operating method of an electronic device includes receiving a first signal, a second signal, and a third signal alternately transitioning in a preamble interval, detecting unit intervals between two transition timings being the closest in time from among transition timings of the first signal, the second signal, and the third signal, performing skew calibration by delaying at least one of the first signal, the second signal, and the third signal by using the unit intervals, recovering a clock signal from the first signal, the second signal, and the third signal, after the skew calibration is completed, and recovering data from the first signal, the second signal, and the third signal, by using the clock signal.

BRIEF DESCRIPTION OF THE FIGURES

The above and other objects and features of the inventive concepts will become apparent by describing in detail example embodiments thereof with reference to the accompanying drawings.

DETAILED DESCRIPTION

Below, example embodiments of the inventive concepts may be described in detail and clearly to such an extent that an ordinary one in the art easily implements the inventive concepts.

Figure 1:
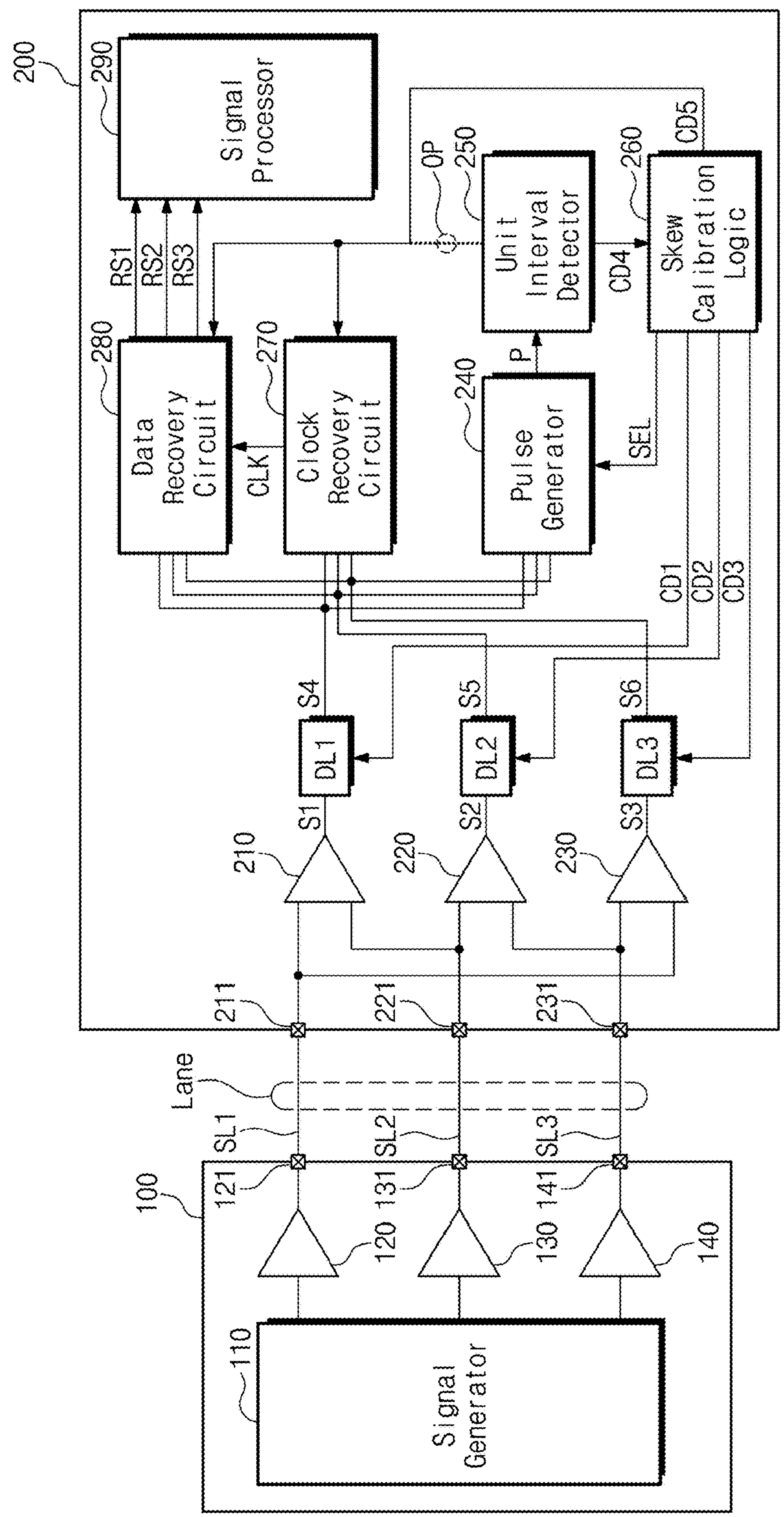
FIG. 1 illustrates an electronic device system according to example embodiments of the inventive concepts.

FIG. 1 illustrates an electronic device system according to example embodiments of the inventive concepts. Referring to FIG. 1, an electronic device system may include a first electronic device 100 and a second electronic device 200.

The first electronic device 100 may transmit signals to the second electronic device 200 through a first signal line SL1, a second signal line SL2, and a third signal line SL3. The first signal line SL1, the second signal line SL2, and/or the third signal line SL3 may form one lane and may transfer signals transitioning (or toggling) in connection with each other.

The first electronic device 100 may include a signal generator 110, a first transmitter 120, a second transmitter 130, and/or a third transmitter 140. The signal generator 110 may generate signals to be transferred through the first signal line SL1, the second signal line SL2, and/or the third signal line SL3.

The first transmitter 120, the second transmitter 130, and/or the third transmitter 140 may be respectively connected with the first signal line SL1, the second signal line SL2, and/or the third signal line SL3 through a first terminal 121, a second terminal 131, and a third terminal 141.

The first transmitter 120, the second transmitter 130, and/or the third transmitter 140 may transmit signals based on one of various communication protocols. For example, the first transmitter 120, the second transmitter 130, and/or the third transmitter 140 may transmit signals in compliance with a protocol of the C-PHY defined in the mobile industry processor interface (MIPI).

The second electronic device 200 may receive signals through the first signal line SL1, the second signal line SL2, and/or the third signal line SL3. The second electronic device 200 may include a first receiver 210, a second receiver 220, a third receiver 230, a first delay line DL1, a second delay line DL2, a third delay line DL3, a pulse generator 240, a unit interval detector 250, skew calibration logic 260, a clock recovery circuit 270, a data recovery circuit 280, and/or a signal processor 290.

The first receiver 210, the second receiver 220, and/or the third receiver 230 may respectively receive signals from the first signal line SL1, the second signal line SL2, and/or the third signal line SL3 through a first terminal 211, a second terminal 221, and/or a third terminal 231. The first receiver 210 may output a difference between the signal received from the first signal line SL1 through the first terminal 211 and the signal received from the second signal line SL2 through the second terminal 221 as a first signal S1.

The second receiver 220 may output a difference between the signal received from the second signal line SL2 through the second terminal 221 and the signal received from the third signal line SL3 through the third terminal 231 as a second signal S2. The third receiver 230 may output a difference between the signal received from the third signal line SL3 through the third terminal 231 and the signal received from the first signal line SL1 through the first terminal 211 as a third signal S3.

The first delay line DL1, the second delay line DL2, and/or the third delay line DL3 may respectively receive the first signal S1, the second signal S2, and/or the third signal S3 from the first receiver 210, the second receiver 220, and/or the third receiver 230. Each of the first delay line DL1, the second delay line DL2, and/or the third delay line DL3 may include a plurality of delay units.

The first delay line DL1 may output an output of a delay unit selected by a first code CD1 from among the plurality of delay units as a fourth signal S4. The second delay line DL2 may output an output of a delay unit selected by a second code CD2 from among the plurality of delay units as a fifth signal S5. The third delay line DL3 may output an output of a delay unit selected by a third code CD3 from among the plurality of delay units as a sixth signal S6.

That is, the first delay line DL1, the second delay line DL2, and/or the third delay line DL3 may adjust delay amounts in response to the first code CD1, the second code CD2, and/or the third code CD3, respectively. For example, when the second electronic device 200 initiates communication with the first electronic device 100, each of the first delay line DL1, the second delay line DL2, and/or the third delay line DL3 may have a delay amount of "0" as an initial value.

The pulse generator 240 may receive the fourth signal S4, the fifth signal S5, and/or the sixth signal S6 from the first delay line DL1, the second delay line DL2, and/or the third delay line DL3. The pulse generator 240 may generate and output a pulse signal "P" from the fourth signal S4, the fifth signal S5, and/or the sixth signal S6.

For example, the pulse generator 240 may generate various pulse signals by combining the fourth signal S4, the fifth signal S5, and/or the sixth signal S6. The pulse generator 240 may output a pulse signal selected by a selection signal SEL as the pulse signal "P".

The unit interval detector 250 may receive the pulse signal "P" from the pulse generator 240. The unit interval detector 250 may detect a unit interval from the pulse signal "P". For example, the unit interval may be an interval where the pulse signal "P" has a high level. The unit interval may be identified as indicating an interval where one symbol is included in the fourth signal S4, the fifth signal S5, and/or the sixth signal S6.

For example, based on the C-PHY protocol, the first transmitter 120, the second transmitter 130, and/or the third transmitter 140 may have a preamble interval before transmitting symbols including data. In the preamble interval, the first transmitter 120, the second transmitter 130, and/or the third transmitter 140 may transmit signals for detection of the unit interval.

The unit interval detector 250 may detect the unit interval from the pulse signal "P" during the preamble interval. The unit interval detector 250 may include a plurality of delay units. The unit interval detector 250 may detect the unit interval by using the plurality of delay units. The unit interval detector 250 may output information about a length of the unit interval as a fourth code CD4.

The skew calibration logic 260 may receive the fourth code CD4 from the unit interval detector 250. For example, the skew calibration logic 260 may receive the fourth code CD4 from the unit interval detector 250 three times or more. The skew calibration logic 260 may receive, from the unit interval detector 250, the fourth code CD4 including information about a skew between the fourth signal S4 and the fifth signal S5, the fourth code CD4 including information about a skew between the fifth signal S5 and/or the sixth signal S6, and the fourth code CD4 including information about a skew between the sixth signal S6 and the fourth signal S4 by controlling the selection signal SEL.

The skew calibration logic 260 may receive the fourth code CD4 several times and may adjust at least one of the first code CD1, the second code CD2, and/or the third code CD3 in response to the fourth codes CD4 received several times. The skew calibration logic 260 may adjust at least one of the first code CD1, the second code CD2, and/or the third code CD3 such that a skew decreases.

The skew calibration logic 260 may perform a skew calibration operation several times. For example, the skew calibration logic 260 may receive the fourth code CD4 several times and may perform one skew calibration operation by adjusting at least one of the first code CD1, the second code CD2, and/or the third code CD3.

Afterwards, the skew calibration logic 260 may receive the fourth code CD4 several times. When a skew is equal to or greater than a threshold value, the skew calibration logic 260 may again perform the skew calibration operation by adjusting at least one of the first code CD1, the second code CD2, and/or the third code CD3. When the skew is smaller than the threshold value, the skew calibration logic 260 may output a fifth code CD5 indicating a length of the unit interval after the skew calibration operation is completed.

Alternatively, as marked by an option OP in FIG. 1, the skew calibration logic 260 may allow the unit interval detector 250 to output the fifth code CD5 indicating a length of the unit interval after the skew calibration operation is completed.

After the skew calibration operation is completed, the clock recovery circuit 270 may receive the fourth signal S4, the fifth signal S5, the sixth signal S6, and the fifth code CD5. The clock recovery circuit 270 may recover a clock signal CLK from the fourth signal S4, the fifth signal S5, and/or the sixth signal S6 by using the fifth code CD5.

Based on the C-PHY protocol, the first transmitter 120, the second transmitter 130, and/or the third transmitter 140 may transmit signals including data, with a clock signal combined with the signals. The combined clock signal may include an embedded clock. The embedded clock may also appear at the fourth signal S4, the fifth signal S5, and/or the sixth signal S6.

In each unit interval, the clock recovery circuit 270 may allow the clock signal CLK to transition to the high level as one of the fourth signal S4, the fifth signal S5, and/or the sixth signal S6 transitions. Afterwards, when the remaining signals of the fourth signal S4, the fifth signal S5, and/or the sixth signal S6 transition in the same symbol interval, the clock recovery circuit 270 may maintain the level of the clock signal CLK without a transition of the clock signal CLK.

For example, the fifth code CD5 may include information of a length of the unit interval, for example, information of a length within 1UI (unit interval) or information of a length within a range from 0.3UI to 0.6UI. The clock recovery circuit 270 may maintain the level of the clock signal CLK by masking the clock signal CLK during a given time within the range from 0.3UI to 0.6UI after the clock signal CLK transitions in each unit interval.

After the given time elapses, the clock recovery circuit 270 may allow the clock signal CLK to transition to a low level. That is, the clock recovery circuit 270 may generate the clock signal CLK, of which a period corresponds to the unit interval. For example, the clock recovery circuit 270 may recover the clock signal CLK in response to receiving the fifth code CD5 from the unit interval detector 250 or the skew calibration logic 260.

The data recovery circuit 280 may receive the fourth signal S4, the fifth signal S5, the sixth signal S6, the fifth code CD5, and the clock signal CLK. The data recovery circuit 280 may delay the fourth signal S4, the fifth signal S5, and/or the sixth signal S6 based on the fifth code CD5. For example, the data recovery circuit 280 may adjust a delay amount so as to make it easy to latch the fourth signal S4, the fifth signal S5, and/or the sixth signal S6. For example, the delay amount may be 0.5UI or a value similar thereto.

The data recovery circuit 280 may respectively latch the delayed fourth signal S4, the delayed fifth signal S5, and the delayed sixth signal S6 in synchronization with the clock signal CLK. The data recovery circuit 280 may output the latched results as a first receive signal RS1, a second receive signal RS2, and a third receive signal RS3. The first receive signal RS1, the second receive signal RS2, and/or the third receive signal RS3 may be recovered data.

In example embodiments, the data recovery circuit 280 may receive the fifth code CD5 from the unit interval detector 250 or the skew calibration logic 260 and may recover data in response to receiving the clock signal CLK from the clock recovery circuit 270.

The signal processor 290 may receive the first receive signal RS1, the second receive signal RS2, and/or the third receive signal RS3. The signal processor 290 may operate in response to the first receive signal RS1, the second receive signal RS2, and/or the third receive signal RS3.

In example embodiments, the first electronic device 100 may be an application processor (AP), and the second electronic device 200 may be a display device. For another example, the first electronic device 100 may be an image sensor, and the second electronic device 200 may be an application processor (AP).

One lane including the first signal line SL1, the second signal line SL2, and/or the third signal line SL3 is illustrated in FIG. 1. However, the first electronic device 100 and the second electronic device 200 may communicate with each other through two or more lanes.

In example embodiments, the first receiver 210, the second receiver 220, the third receiver 230, the first terminal 211, the second terminal 221, and/or the third terminal 231 may be included in a reception unit that receives signals of the first signal line SL1, the second signal line SL2, and/or the third signal line SL3.

In example embodiments, the first delay line DL1, the second delay line DL2, the third delay line DL3, the pulse generator 240, the unit interval detector 250, and the skew calibration logic 260 may be included in a skew calibration unit. In example embodiments, the clock recovery circuit 270 and the data recovery circuit 280 may be included in a recovery unit.

In example embodiments, the selection signal SEL may be a 2-bit signal, and each of the first code CD1, the second code CD2, the third code CD3, the fourth code CD4, and the fifth code CD5 may be a 32-bit signal.

Figure 2:
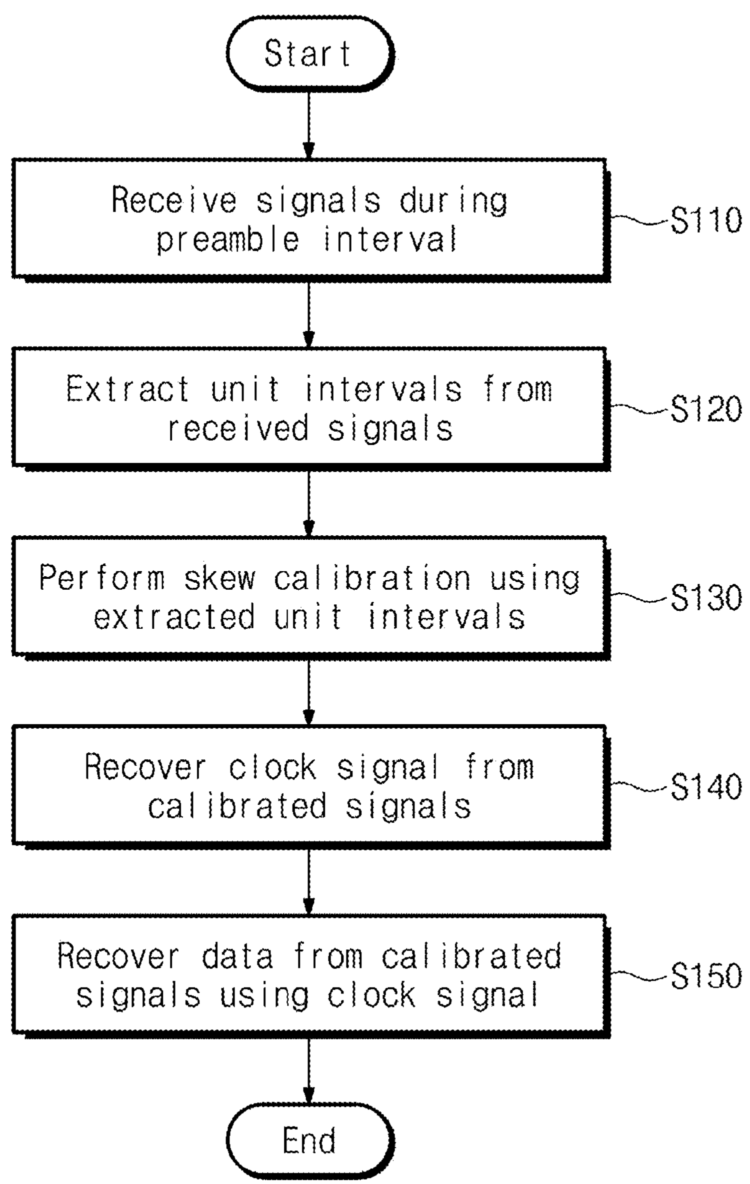
FIG. 2 illustrates an operating method of a second electronic device according to example embodiments of the inventive concepts.

FIG. 2 illustrates an operating method of the second electronic device 200 according to example embodiments of the inventive concepts. Referring to FIGS. 1 and 2, in operation S110, the first receiver 210, the second receiver 220, and/or the third receiver 230 may receive signals of the first signal line SL1, the second signal line SL2, and/or the third signal line SL3 during the preamble interval and may output the first signal S1, the second signal S2, and/or the third signal S3.

Because the initial delay amounts of the first signal line SL1, the second signal line SL2, and/or the third signal line SL3 are "0", the fourth signal S4, the fifth signal S5, and/or the sixth signal S6 may be identical to the first signal S1, the second signal S2, and/or the third signal S3, respectively.

In operation S120, the pulse generator 240 may generate the pulse signal "P" from the fourth signal S4, the fifth signal S5, and/or the sixth signal S6. The unit interval detector 250 may extract or detect lengths of unit intervals from the pulse signal "P".

In operation S130, the skew calibration logic 260 may perform skew calibration by using the lengths of the unit intervals thus detected. For example, the skew calibration logic 260 may adjust a delay amount of at least one of the first delay line DL1, the second delay line DL2, and/or the third delay line DL3 such that the lengths of the unit intervals are identical or differences between the lengths of the unit intervals decrease.

Operation S110 to operation S130 may be included in the skew calibration operation. The skew calibration logic 260 may again check the lengths of the unit intervals after performing the skew calibration operation. When the differences between the lengths of the unit intervals are equal to or greater than a threshold, the skew calibration logic 260 may again perform the skew calibration operation. When the differences between the lengths of the unit intervals are smaller than the threshold, the skew calibration logic 260 may complete the skew calibration operation.

In operation S140, the unit interval detector 250 or the skew calibration logic 260 may generate the fifth code CD5. In response to the fifth code CD5, the clock recovery circuit 270 may recover the clock signal CLK from the fourth signal S4, the fifth signal S5, and/or the sixth signal S6, of which the skew calibration operation is completed.

In operation S150, in response to that the fifth code CD5 is received and the clock signal CLK is recovered, the data recovery circuit 280 may recover data including the first receive signal RS1, the second receive signal RS2, and/or the third receive signal RS3 from the fourth signal S4, the fifth signal S5, and/or the sixth signal S6, of which the skew calibration operation is completed.

Figure 3:
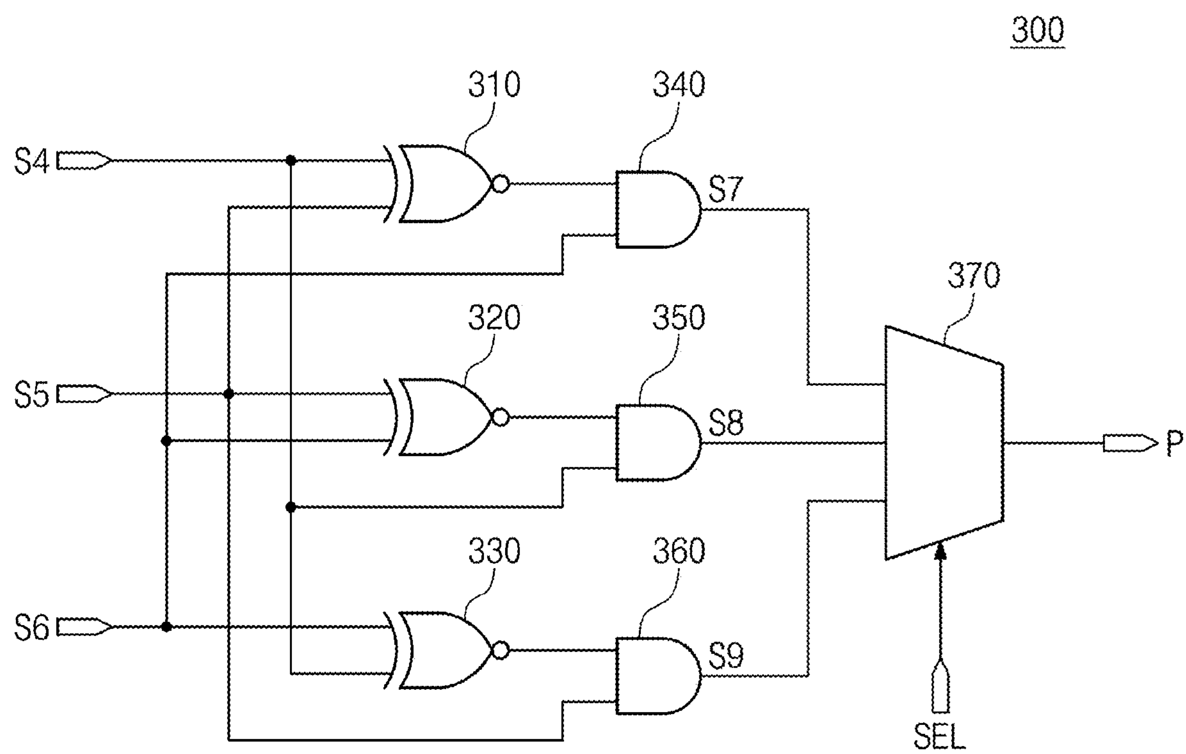
FIG. 3 illustrates an example of a pulse generator.

FIG. 3 illustrates an example of a pulse generator 300. The pulse generator 300 of FIG. 3 may be included in the pulse generator 240 of FIG. 1. Referring to FIGS. 1 and 3, the pulse generator 300 may include a first logic gate 310, a second logic gate 320, a third logic gate 330, a fourth logic gate 340, a fifth logic gate 350, a sixth logic gate 360 and/or a selector 370.

The first logic gate 310 may receive the fourth signal S4 and the fifth signal S5. The first logic gate 310 may perform an exclusive NOR operation on the fourth signal S4 and the fifth signal S5. The fourth logic gate 340 may perform an AND operation on an output of the first logic gate 310 and/or the sixth signal S6. The fourth logic gate 340 may output a result of the operation as a seventh signal S7.

The second logic gate 320 may receive the fifth signal S5 and/or the sixth signal S6. The second logic gate 320 may perform an exclusive NOR operation on the fifth signal S5 and/or the sixth signal S6. The fifth logic gate 350 may perform an AND operation on an output of the second logic gate 320 and the seventh signal S7. The fifth logic gate 350 may output a result of the operation as an eighth signal S8.

The third logic gate 330 may receive the sixth signal S6 and the fourth signal S4. The third logic gate 330 may perform an exclusive NOR operation on the sixth signal S6 and the fourth signal S4. The sixth logic gate 360 may perform an AND operation on an output of the third logic gate 330 and the fourth signal S4. The sixth logic gate 360 may output a result of the operation as a ninth signal S9.

The selector 370 may receive the seventh signal S7, the eighth signal S8, and/or the ninth signal S9. The selector 370 may select one of the seventh signal S7, the eighth signal S8, and/or the ninth signal S9 in response to the selection signal SEL and may output the selected signal as the pulse signal "P".

Figure 4:
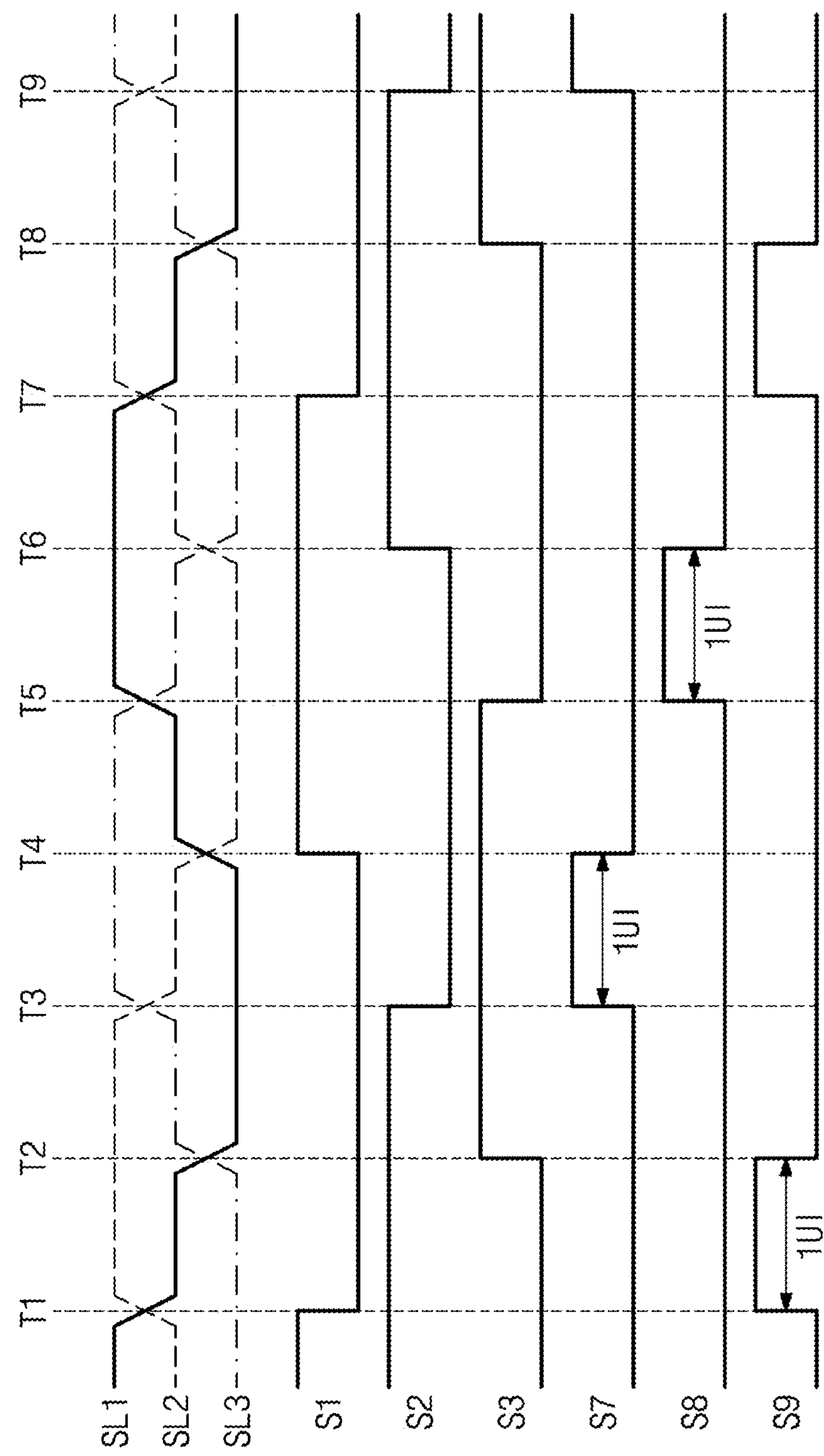
FIG. 4 illustrates an example of signals associated with a second electronic device.

FIG. 4 illustrates an example of signals associated with the second electronic device 200. In example embodiments, an example of skew-free signals is illustrated in FIG. 4. Referring to FIGS. 1, 3, and 4, a solid line indicates a signal of the first signal line SL1, a broken line indicates a signal of the second signal line SL2, and a dash-single dotted line indicates a signal of the third signal line SL3.

The signals of the first signal line SL1, the second signal line SL2, and/or the third signal line SL3 may vary in the preamble interval in compliance with the C-PHY protocol as illustrated in FIG. 4. For example, each of the first signal line SL1, the second signal line SL2, and/or the third signal line SL3 may have a high level during to a length of two unit intervals, may have a middle level during to a length of one unit interval, and may have a low level during to a length of two unit intervals.

Signals of the first signal line SL1, the second signal line SL2, and/or the third signal line SL3 may have different levels every unit interval. When a skew does not exist, transition (or toggle) timings of the signals of the first signal line SL1, the second signal line SL2, and/or the third signal line SL3 may be identical.

The first receiver 210, the second receiver 220, and/or the third receiver 230 may output the first signal S1, the second signal S2, and/or the third signal S3 from the signals of the first signal line SL1, the second signal line SL2, and/or the third signal line SL3. During the preamble interval, the first signal S1, the second signal S2, and/or the third signal S3 may alternately transition in each unit interval.

In each unit interval, only one of the first signal S1, the second signal S2, and/or the third signal S3 may transition. The first signal S1, the second signal S2, and/or the third signal S3 may sequentially transition one by one in three consecutive unit intervals.

Initial delay amounts of the first delay line DL1, the second delay line DL2, and/or the third delay line DL3 may be "0". Accordingly, waveforms of the fourth signal S4, the fifth signal S5, and/or the sixth signal S6 are identical to waveforms of the first signal S1, the second signal S2, and/or the third signal S3, and thus, additional description will be omitted to avoid redundancy.

The seventh signal S7 may have the high level when the fourth signal S4 (e.g., the first signal S1) is at the low level and the fifth signal S5 (e.g., the second signal S2) is at the low level. A time length of an interval of the high level of the seventh signal S7 may indicate a time length of one unit interval 1UI indicated by a combination of the first signal S1 and the second signal S2.

The eighth signal S8 may have the high level when the fifth signal S5 (e.g., the second signal S2) is at the low level and/or the sixth signal S6 (e.g., the third signal S3) is at the low level. A time length of an interval of the high level of the eighth signal S8 may indicate a time length of one unit interval 1UI indicated by a combination of the second signal S2 and/or the third signal S3.

The ninth signal S9 may have the high level when the sixth signal S6 (e.g., the third signal S3) is at the low level and the fourth signal S4 (e.g., the first signal S1) is at the low level. A time length of an interval of the high level of the ninth signal S9 may indicate a time length of one unit interval 1UI indicated by a combination of the third signal S3 and the first signal S1.

When a skew does not exist, transition (or toggle) timings of the signals of the first signal line SL1, the second signal line SL2, and/or the third signal line SL3 are identical. For example, as illustrated in FIG. 4, the signals of the first signal line SL1, the second signal line SL2, and/or the third signal line SL3 may transition at a first time T1 to a ninth time T9. Accordingly, one unit interval 1UI that appears at each of the seventh signal S7, the eighth signal S8, and/or the ninth signal S9 may have the same time length.

Figure 5:
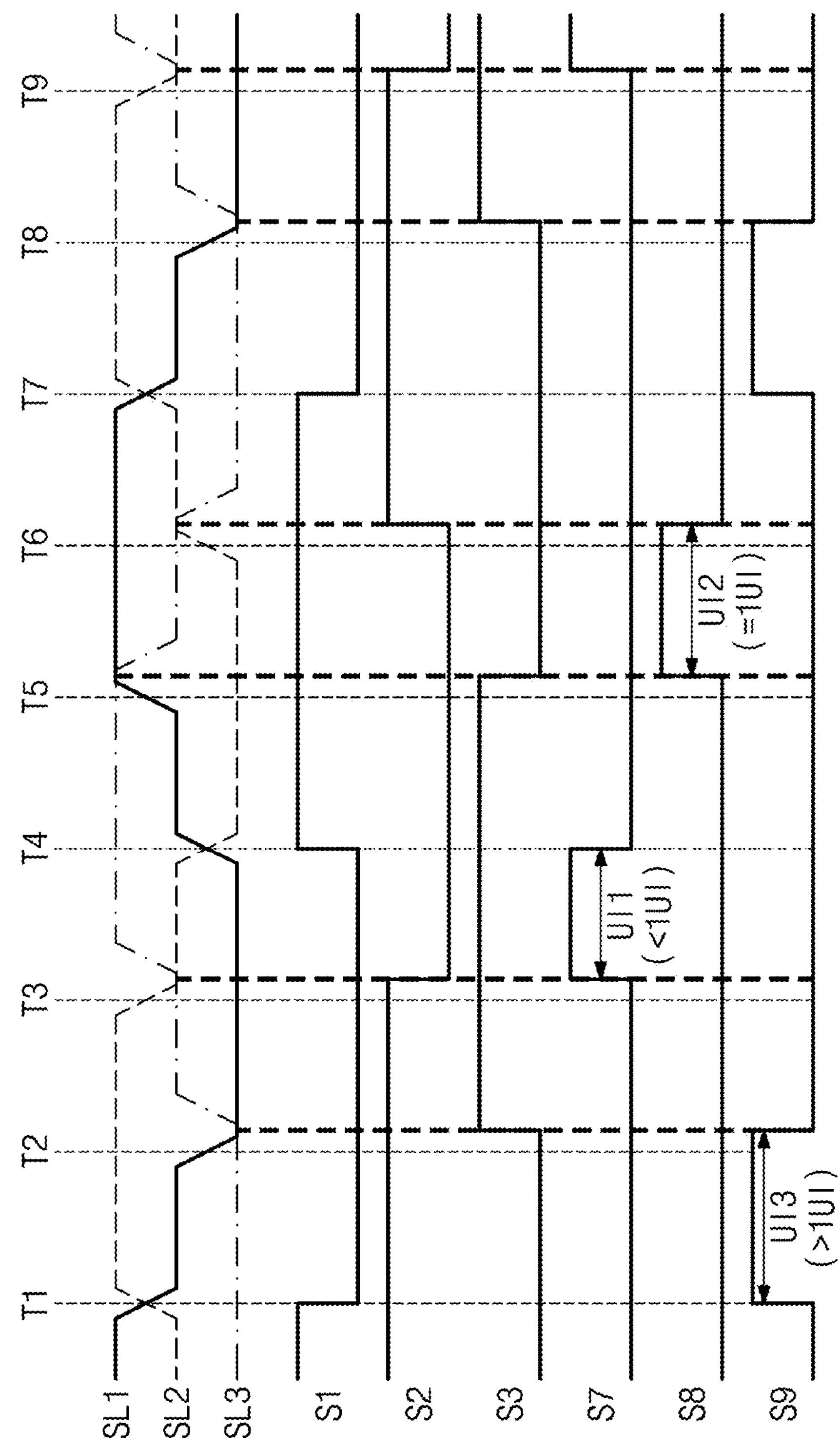
FIG. 5 illustrates an example of signals associated with a second electronic device when a skew of a first type exists.

FIG. 5 illustrates an example of signals associated with the second electronic device 200 when a skew of a first type exists. Referring to FIGS. 1, 3, and 5, in a skew of a first type, one signal of signals of the first signal line SL1, the second signal line SL2, and/or the third signal line SL3 may be delayed with respect to the remaining signals. In example embodiments, the signal of the third signal line SL3 may be delayed with respect to the signals of the first signal line SL1 and the second signal line SL2.

Transition timings of the signal of the third signal line SL3 may be delayed with respect to the first time T1 to the ninth time T9. In FIG. 5, bold dotted lines are used to highlight timings at which the signal of the third signal line SL3 transitions.

As the signal of the third signal line SL3 is delayed, a time length of a first unit interval UI1 detected from the seventh signal S7 may be shorter than a time length of one unit interval 1UI equal to that of FIG. 4. A time length of a second unit interval UI2 detected from the eighth signal S8 may be equal to a time length of one unit interval 1UI equal to that of FIG. 4. A time length of a third unit interval UI3 detected from the ninth signal S9 may be longer than a time length of one unit interval 1UI equal to that of FIG. 4.

In example embodiments, the pulse generator 240 may output the pulse signal "P" including a pulse signal of the first unit interval UI1, a pulse signal of the second unit interval UI2, and a pulse signal of the third unit interval UI3 by alternately outputting the seventh signal S7, the eighth signal S8, and/or the ninth signal S9. The unit interval detector 250 may detect time lengths of the first unit interval UI1, the second unit interval UI2, and/or the third unit interval UI3 from the pulse signal "P".

Figure 6:
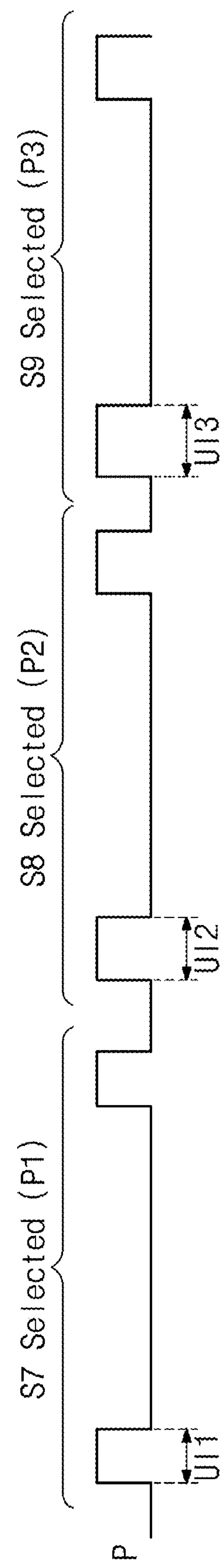
FIG. 6 illustrates an example of a pulse signal when a skew of a first type exists.

FIG. 6 illustrates an example of the pulse signal "P" when a skew of a first type exists. Referring to FIGS. 1, 3, 5, and 6, when the seventh signal S7 is selected, the pulse generator 240 may output a portion of the seventh signal S7 as a first pulse signal P1 being a portion of the pulse signal "P". When the eighth signal S8 is selected, the pulse generator 240 may output a portion of the eighth signal S8 as a second pulse signal P2 being a portion of the pulse signal "P". When the ninth signal S9 is selected, the pulse generator 240 may output a portion of the ninth signal S9 as a third pulse signal P3 being a portion of the pulse signal "P".

The timing when the unit interval detector 250 starts the detection of the unit interval may not be fixed to a specific time of the pulse signal "P". As illustrated in FIG. 5, a time length between two first unit intervals UI1 corresponds to six first unit intervals UI1.

Accordingly the first pulse signal P1 may be output during a time corresponding to 6 to 12 unit intervals or during a time longer than the time corresponding to 6 to 12 unit intervals, such that the first pulse signal P1 includes the whole interval of at least one first unit interval UI1. That is, the skew calibration logic 260 may allow the pulse generator 240 to output the first pulse signal P1 during a time corresponding to 6 to 12 unit intervals or during a time longer than the time corresponding to 6 to 12 unit intervals.

The skew calibration logic 260 may identify the fourth code CD4 corresponding to the longest time length from among the fourth codes CD4 received from the unit interval detector 250 as a length of the first unit interval UI1, based on the first pulse signal P1. After a given time elapses, the skew calibration logic 260 may control the selection signal SEL to select the second pulse signal P2.

For another example, the skew calibration logic 260 may select the first pulse signal P1 and may maintain the selection signal SEL until at least two the fourth codes CD4 are received from the unit interval detector 250. The skew calibration logic 260 may identify the last fourth code CD4 of the at least two fourth codes CD4 or the fourth code CD4 corresponding to the longest time length from among the at least two fourth codes CD4 as corresponding to the first unit interval UI1. After the at least two fourth codes CD4 are received, the skew calibration logic 260 may control the selection signal SEL to select the second pulse signal P2.

In example embodiments where the first pulse signal P1 is selected, when the second pulse signal P2 is selected, the skew calibration logic 260 may maintain the selection signal SEL during a given time or until the fourth codes CD4 are received as much as the given number of times. The skew calibration logic 260 may identify the last fourth code CD4 or the fourth code CD4 corresponding to the longest time length as corresponding to the second unit interval UI2.

In example embodiments where the first pulse signal P1 is selected, when the third pulse signal P3 is selected, the skew calibration logic 260 may maintain the selection signal SEL during a given time or until the fourth codes CD4 are received as much as the given number of times. The skew calibration logic 260 may identify the last fourth code CD4 or the fourth code CD4 corresponding to the longest time length as corresponding to the third unit interval UI3.

Figure 7:
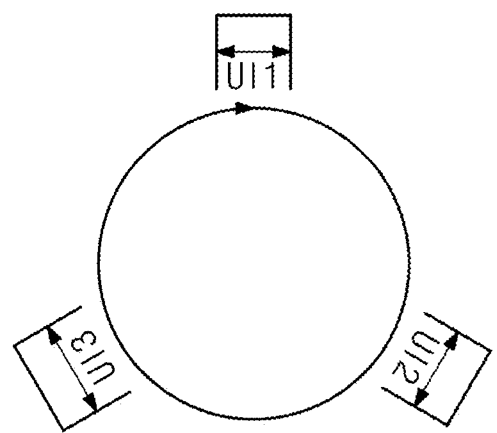
FIG. 7 illustrates an example in which a first unit interval, a second unit interval, and a third unit interval are disposed in a clockwise direction.

FIG. 7 illustrates an example in which the first unit interval UI1, the second unit interval UI2, and/or the third unit interval UI3 are disposed in a clockwise direction. Referring to FIGS. 5, 6, and 7, the first pulse signal P1 may have a first length corresponding to the first unit interval UI1, the second pulse signal P2 may have a second length corresponding to the second unit interval UI2, and/or the third pulse signal P3 may have a third length corresponding to the third unit interval UI3.

In example embodiments of disposing the first length, the second length, and/or the third length in the clockwise direction as illustrated in FIG. 7, the clockwise direction is a direction facing the third length being the longest from the first length being the shortest through the second length being middle. As illustrated in FIG. 5, when a signal of one signal line (e.g., the third signal line SL3) is delayed with respect to signals of the remaining signal lines (e.g., the first and second signal lines SL1 and SL2), the clockwise direction may appear as a direction in which a length increases.

Figure 8:
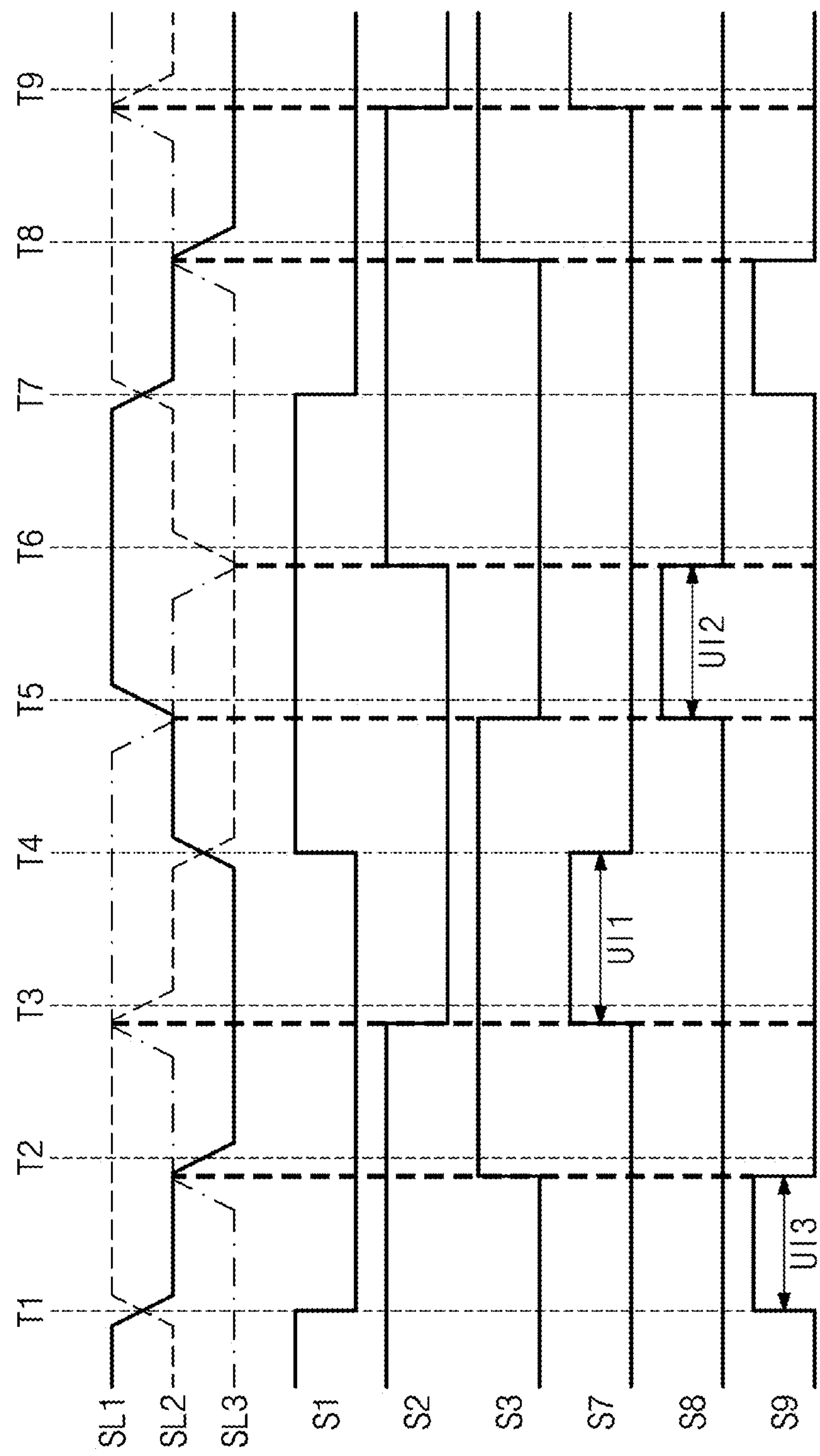
FIG. 8 illustrates an example of signals associated with a second electronic device when a skew of a second type exists.

FIG. 8 illustrates an example of signals associated with the second electronic device 200 when a skew of a second type exists. Referring to FIGS. 1, 3, and 8, in a skew of a second type, one signal of signals of the first signal line SL1, the second signal line SL2, and/or the third signal line SL3 may be advanced with respect to the remaining signals. In example embodiments, the signal of the third signal line SL3 may be advanced with respect to the signals of the first signal line SL1 and the second signal line SL2.

Transition timings of the signal of the third signal line SL3 may be advanced with respect to the first time T1 to the ninth time T9. In FIG. 5, bold dotted lines are used to highlight timings at which the signal of the third signal line SL3 transitions.

As the signal of the third signal line SL3 is advanced, a time length of the first unit interval UI1 detected from the seventh signal S7 may be longer than a time length of one unit interval 1UI equal to that of FIG. 4. A time length of the second unit interval UI2 detected from the eighth signal S8 may be equal to a time length of one unit interval 1UI equal to that of FIG. 4. A time length of the third unit interval UI3 detected from the ninth signal S9 may be shorter than a time length of one unit interval 1UI equal to that of FIG. 4.

In example embodiments, the pulse generator 240 may output the pulse signal "P" including a pulse signal of the first unit interval UI1, a pulse signal of the second unit interval UI2, and a pulse signal of the third unit interval UI3 by alternately outputting the seventh signal S7, the eighth signal S8, and/or the ninth signal S9. The unit interval detector 250 may detect time lengths of the first unit interval UI1, the second unit interval UI2, and/or the third unit interval UI3 from the pulse signal "P".

Figure 9:
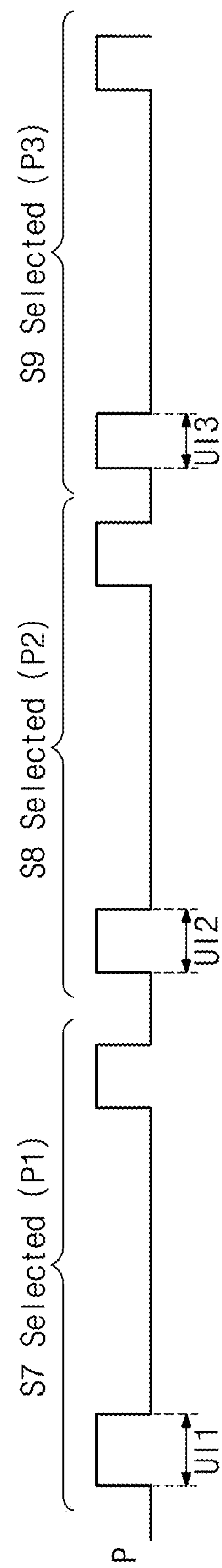
FIG. 9 illustrates an example of a pulse signal when a skew of a second type exists.

FIG. 9 illustrates an example of the pulse signal "P" when a skew of a second type exists. Referring to FIGS. 1, 3, 8, and 9, when the seventh signal S7 is selected, the pulse generator 240 may output a portion of the seventh signal S7 as the first pulse signal P1 being a portion of the pulse signal "P". When the eighth signal S8 is selected, the pulse generator 240 may output a portion of the eighth signal S8 as the second pulse signal P2 being a portion of the pulse signal "P". When the ninth signal S9 is selected, the pulse generator 240 may output a portion of the ninth signal S9 as the third pulse signal P3 being a portion of the pulse signal "P".

As described with reference to FIGS. 8 and 9, the skew calibration logic 260 may sequentially select the first pulse signal P1, the second pulse signal P2, and/or the third pulse signal P3 and may maintain the selection signal SEL during a given time or until the fourth codes CD4 are received as much as the given number of times. The skew calibration logic 260 may identify the last fourth code CD4 or the fourth code CD4 corresponding to the longest time length as corresponding to the second unit interval UI2.

Figure 10:
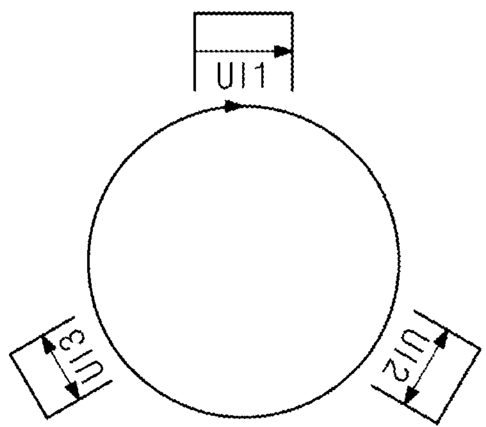
FIG. 10 illustrates an example in which a first unit interval, a second unit interval, and a third unit interval are disposed in a clockwise direction.

FIG. 10 illustrates an example in which the first unit interval UI1, the second unit interval UI2, and/or the third unit interval UI3 are disposed in a clockwise direction. Referring to FIGS. 8, 9, and 10, the first pulse signal P1 may have a sixth length corresponding to the first unit interval UI1, the second pulse signal P2 may have a fifth length corresponding to the second unit interval UI2, and/or the third pulse signal P3 may have a fourth length corresponding to the third unit interval UI3.

In example embodiments of disposing the fourth length, the fifth length, and/or the sixth length in the clockwise direction as illustrated in FIG. 10, the clockwise direction is a direction facing the fourth length being the shortest from the sixth length being the longest through the fifth length being middle. As illustrated in FIG. 8, when a signal of one signal line (e.g., the third signal line SL3) is advanced with respect to signals of the remaining signal lines (e.g., the first and second signal lines SL1 and SL2), the clockwise direction may appear as a direction in which a length decreases.

Figure 11:
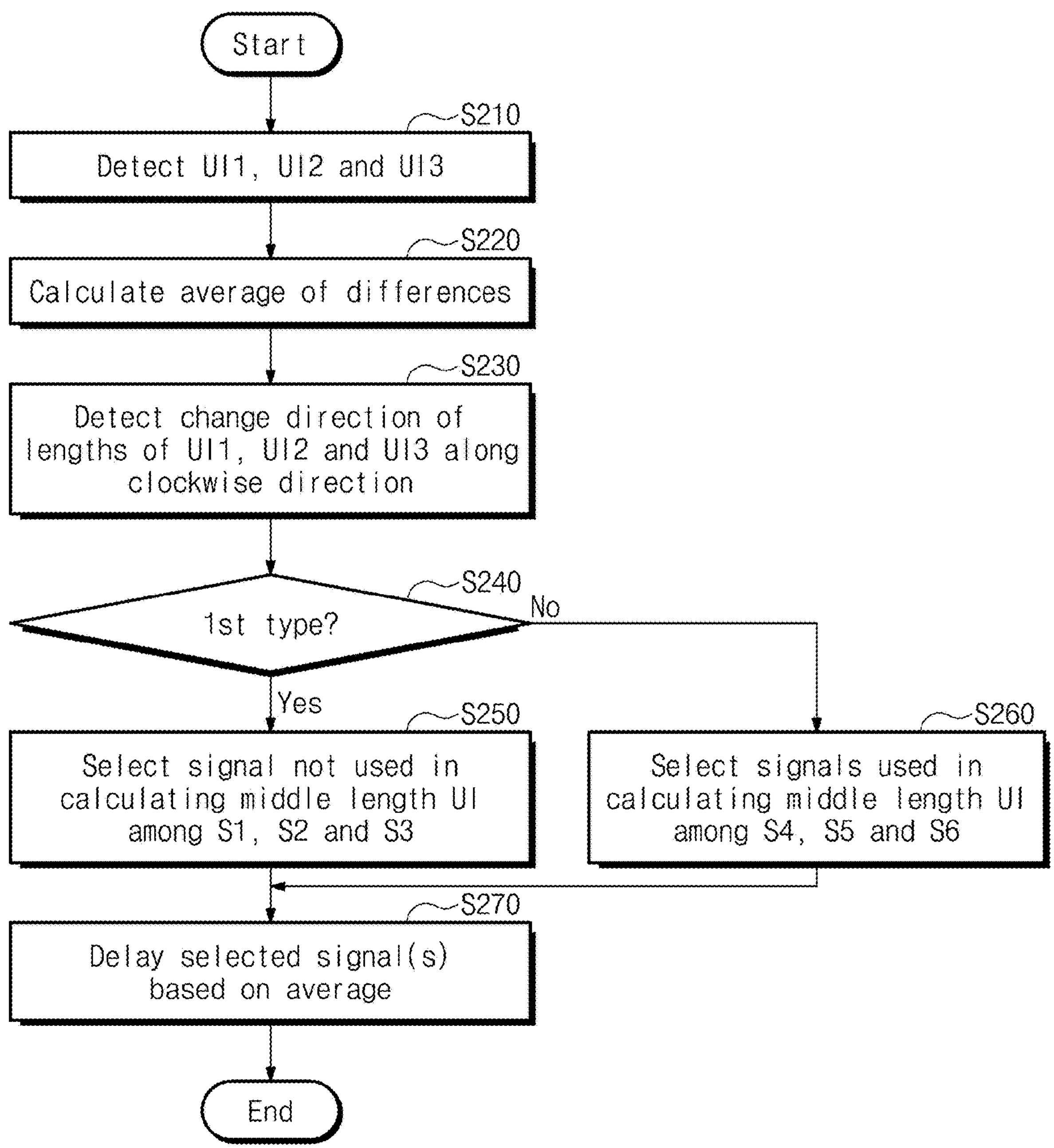
FIG. 11 illustrates an example of a method in which skew calibration logic performs a skew calibration operation.

FIG. 11 illustrates an example of a method in which the skew calibration logic 260 performs a skew calibration operation. Referring to FIGS. 1 and 11, in operation S210, the skew calibration logic 260 may detect lengths of the first unit interval UI1, the second unit interval UI2, and/or the third unit interval UI3.

In operation S220, the skew calibration logic 260 may calculate an average of differences between the lengths of the first unit interval UI1, the second unit interval UI2, and/or the third unit interval UI3. For example, the skew calibration logic 260 may detect a middle length, a long length greater than the middle length, and a short length smaller than the middle length from the lengths of the first unit interval UI1, the second unit interval UI2, and/or the third unit interval UI3.

The skew calibration logic 260 may calculate a first difference between the middle length and the long length and a second difference between the middle length and the short length. The skew calibration logic 260 may further calculate a third difference being an average of the first difference and the second difference.

In operation S230, the skew calibration logic 260 may detect a change direction of the lengths of the first unit interval UI1, the second unit interval UI2, and/or the third unit interval UI3, along a clockwise direction. For example, as described with reference to FIG. 7, in example embodiments where the change direction is the clockwise direction in which the lengths of the first unit interval UI1, the second unit interval UI2, and/or the third unit interval UI3 change from the shortest to the longest, it may be determined that the skew of the first type exists.

For another example, as described with reference to FIG. 10, in example embodiments where the change direction is the clockwise direction in which the lengths of the first unit interval UI1, the second unit interval UI2, and/or the third unit interval UI3 changes from the longest to the shortest, it may be determined that the skew of the second type exists.

When it is determined in operation S240 that the skew of the first type exists, operation S250 is performed. When it is determined in operation S240 that the skew of the second type exists, operation S260 is performed.

When the skew of the first type exists, as illustrated in FIG. 5, the skew may be calibrated by delaying the third signal S3. The third signal S3 is not used to generate the second unit interval UI2 corresponding to the middle length. That is, when the skew of the first type exists, in operation S250, a signal, which is not used to calculate a unit interval of the middle length, from among the first signal S1, the second signal S2, and/or the third signal S3 may be selected as a target for skew calibration.

When the skew of the second type exists, as illustrated in FIG. 8, the skew may be calibrated by delaying the second signal S2 and/or the third signal S3. The second signal S2 and/or the third signal S3 are used to generate the second unit interval UI2 corresponding to the middle length. That is, when the skew of the second type exists, in operation S260, signals, which are used to calculate a unit interval of the middle length, from among the first signal S1, the second signal S2, and/or the third signal S3 may be selected as a target for skew calibration.

In operation S270, the skew calibration logic 260 may perform the skew calibration operation by delaying the selected signal(s) as much as the third difference corresponding to the average.

The examples of the skews of the first type and the second type are schematically illustrated in FIGS. 5 and 8. Timings when the signals of the first signal line SL1, the second signal line SL2, and/or the third signal line SL3 toggle may be different. By repeating the skew calibration operation, the skew calibration logic 260 of the inventive concepts may make it possible to calibrate any types of skews through three or less skew calibration operations.

In example embodiments, the second electronic device 200 may perform skew calibration with the first electronic device 100 in the following: initialization, reset, occurrence of a communication error, a regular interval, a change of an ambient environment such as a temperature or humidity, or instructions of a user or an external device.

Figure 12:
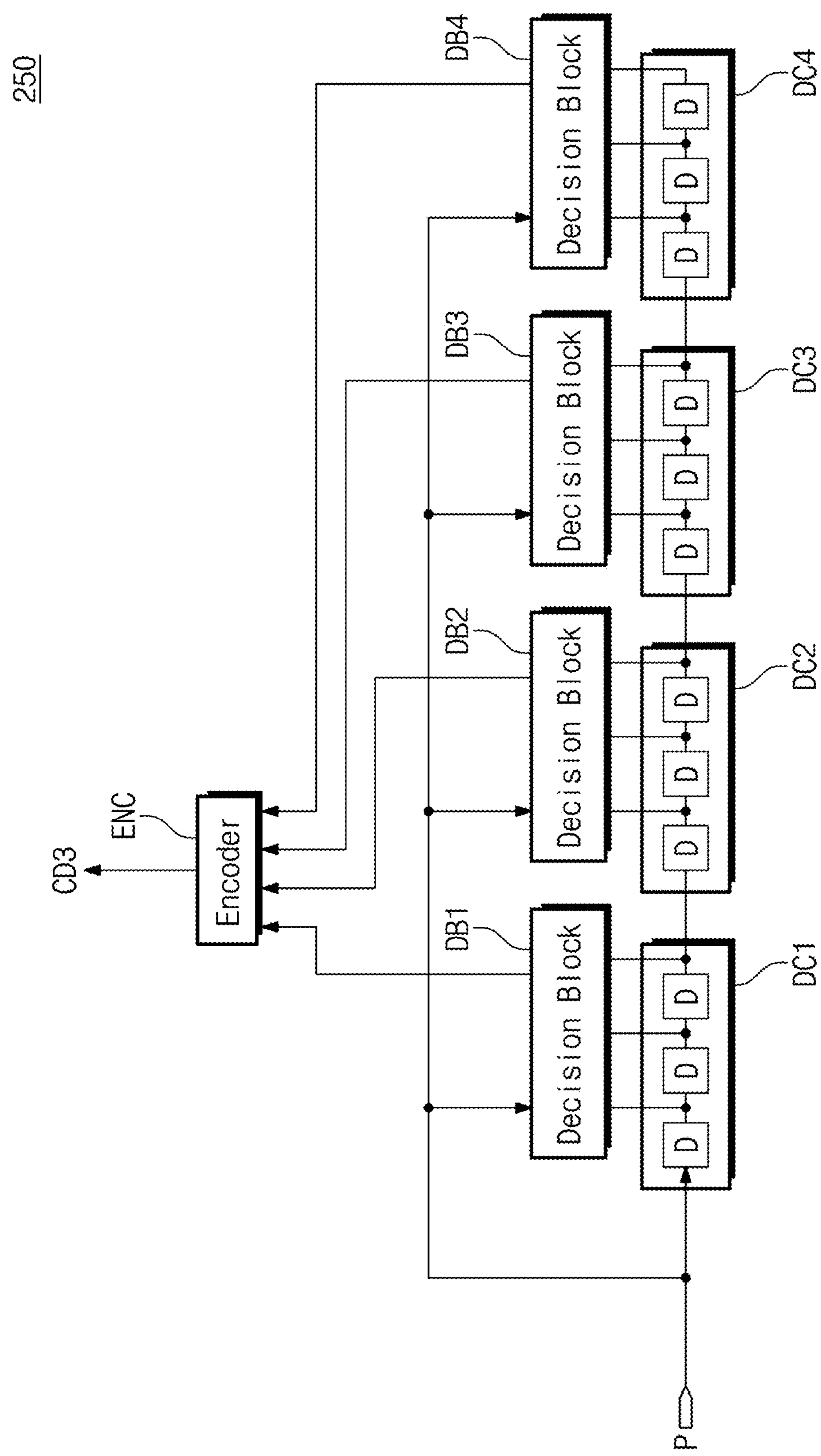
FIG. 12 illustrates a unit interval detector according to example embodiments of the inventive concepts.

FIG. 12 illustrates the unit interval detector 250 according to example embodiments of the inventive concepts. Referring to FIGS. 1 and 12, the unit interval detector 250 may include first to fourth delay cells DC1 to DC4, first to fourth decision blocks DB1 to DB4, and/or an encoder ENC.

Each of the first to fourth delay cells DC1 to DC4 may include two or more delay units "D". In example embodiments, it is assumed that each of the first to fourth delay cells DC1 to DC4 may include three delay units "D", but the number of delay cells "D" is not limited.

The first to fourth decision blocks DB1 to DB4 may detect a delay cell, in which a rising edge of the pulse signal "P" exists, from among the first to fourth delay cells DC1 to DC4 in synchronization with a falling edge of the pulse signal "P". A decision block connected with the delay cell, in which the rising edge exists, from among the first to fourth delay cells DC1 to DC4 may output, for example, a value of "1". A decision block connected with a delay cell, in which the rising edge does not exist, from among the first to fourth delay cells DC1 to DC4 may output, for example, a value of "0".

When the high level of the pulse signal "P" is input to the first delay cell DC1, a head of the interval of the high level, that is, the rising edge may pass through the delay units "D" of the first to fourth delay cells DC1 to DC4. When a tail of the interval of the high level of the pulse signal "P", that is a falling edge of the pulse signal "p" appears, a delay amount of delay cells up to a delay cell, in which the rising edge of the pulse signal "P" is included, from among the first to fourth delay cells DC1 to DC4 may correspond to a time length of the interval of the high level of the pulse signal "P".

The encoder ENC may generate the fourth code CD4 being a binary number from values of "0" and "1" received from the first to fourth decision blocks DB1 to DB4. An example is illustrated in FIG. 12 as the number of delay cells is "4" and the number of decision blocks is "4", but the inventive concepts is not limited thereto. For example, the number of delay cells and the number of decision blocks may be variously modified or changed.

Figure 13:
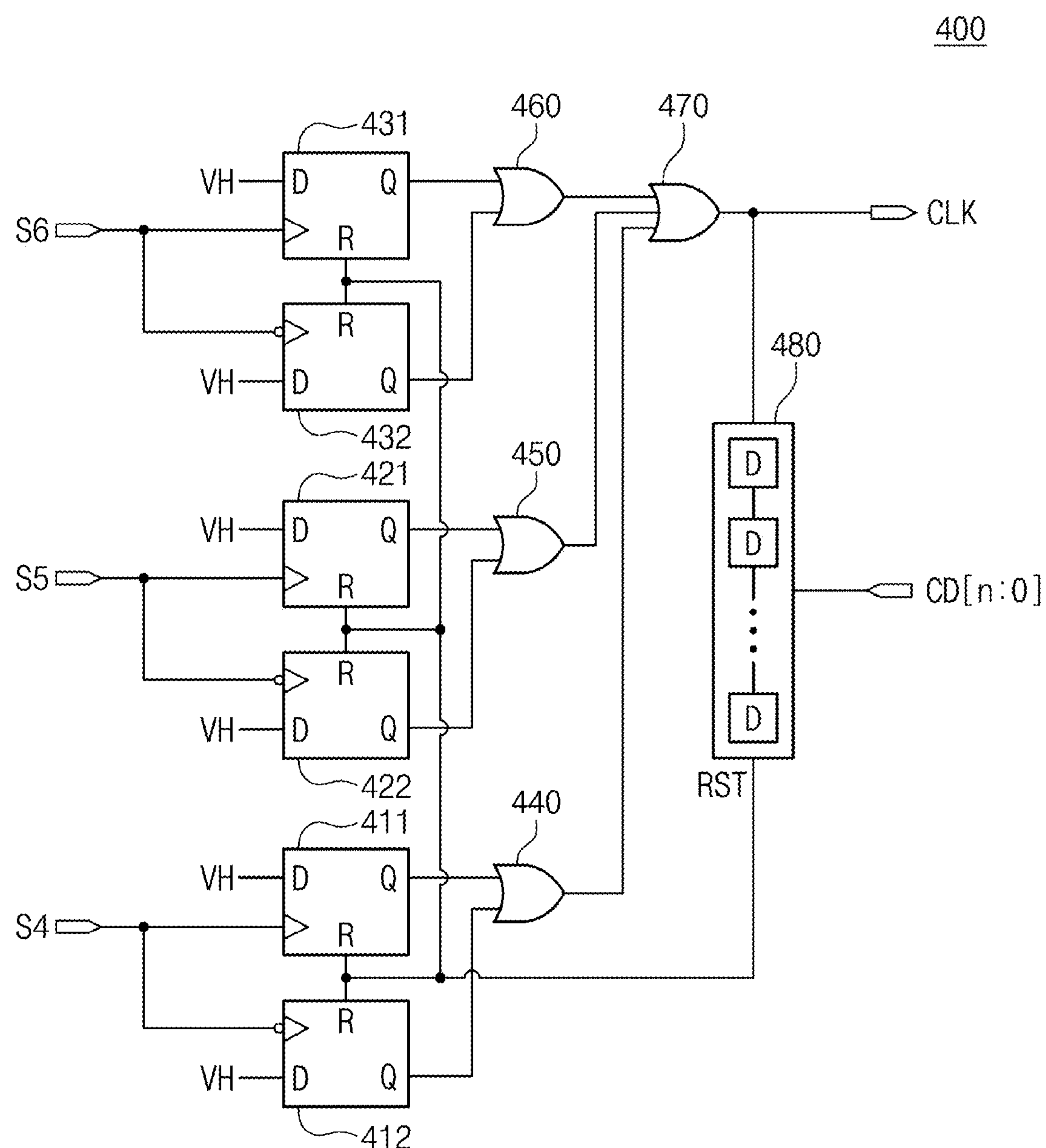
FIG. 13 illustrates a clock recovery circuit according to example embodiments of the inventive concepts.

FIG. 13 illustrates a clock recovery circuit 400 according to example embodiments of the inventive concepts. The clock recovery circuit 400 of FIG. 13 may be included in the clock recovery circuit 270 of FIG. 1. Referring to FIGS. 1 and 13, the clock recovery circuit 400 may include a logic circuit capable of generating the clock signal CLK based on a transition occurring at the fourth to sixth signals S4, S5, and S6. For example, the logic circuit may include first to sixth flip-flops 411, 412, 421, 422, 431, and 432 and first to fourth logic gates 440, 450, 460, and 470.

The first and second flip-flops 411 and 412 may output a logical value of logical high VH (e.g., a value of logic "1") in response to a transition of the fourth signal S4. The first logic gate 440 may combine outputs of the first and second flip-flops 411 and 412. Accordingly, the first logic gate 440 may output a value of logic "1" when the fourth signal S4 transitions.

The third and fourth flip-flops 421 and 422 may output a logical value of logical high VH (e.g., a value of logic "1") in response to a transition of the fifth signal S5. The second logic gate 450 may combine outputs of the third and fourth flip-flops 421 and 422. Accordingly, the second logic gate 450 may output a value of logic "1" when the fifth signal S5 transitions.

The fifth and sixth flip-flops 431 and 432 may output a logical value of logical high VH (e.g., a value of logic "1") in response to a transition of the sixth signal S6. The third logic gate 460 may combine outputs of the fifth and sixth flip-flops 431 and 432. Accordingly, the third logic gate 460 may output a value of logic "1" when the sixth signal S6 transitions.

The fourth logic gate 470 may combine outputs of the first, second, and/or third logic gates 440, 450, and 460. Accordingly, the fourth logic gate 470 may output a value of logic "1" in response to transitions occurring at the fourth, fifth, and sixth signals S4, S5, and S6. However, the fourth logic gate 470 may output a value of logic "1" in response to the first transition of the fourth, fifth, and sixth signals S4, S5, and S6 and may not be affected by transitions following the first transition.

The fourth logic gate 470 may output the clock signal CLK that is generated by the first to sixth flip-flops 411, 412, 421, 422, 431, and 432 and the first to fourth logic gates 440, 450, 460, and 470. For example, a value of logic "1" of the clock signal CLK output from the fourth logic gate 470 may provide a first edge (e.g., a rising edge) of the clock signal CLK.

A delay circuit 480 may receive the clock signal CLK output from the fourth logic gate 470. The delay circuit 480 may delay the received signal to output a reset signal RST. The delay circuit 480 may receive the clock signal CLK and may include delay units "D" sequentially connected.

The first to sixth flip-flops 411, 412, 421, 422, 431 and 432 may be reset in response to the reset signal RST. As the first to sixth flip-flops 411, 412, 421, 422, 431 and 432 are reset, the first to fourth logic gates 440, 450, 460, and 470 may output values of logic "0". A value of logic "0" of the clock signal CLK output from the logic gate 470 may provide a second edge (e.g., a falling edge) of the clock signal CLK. Accordingly, the clock signal CLK may have the second edge in response to the reset signal RST.

A delay amount of the delay units "D" of the delay circuit 480 may be adjusted based on the fifth code CD5. The delay circuit 480 may output the reset signal RST by delaying the clock signal CLK as much as a total delay amount of delay units "D", the number of which is equal to the number of delay cells, which is indicated by the fifth code CD5.

The total delay amount of the delay circuit 480 may belong to a range from 0.35UI to 0.6UI. That is, the clock signal CLK may transition to the high level when one unit interval UI starts and may transition to the low level after a time belonging to the range from 0.35UI to 0.6UI.

For example, a delay amount of the delay unit "D" of FIG. 12 may be equal to a delay amount of the delay unit "D" of the delay circuit 480. In example embodiments where a delay cell of FIG. 12 includes three delay units "D", a ratio of a delay amount of the delay unit "D" of the delay circuit 480 and a delay amount of a delay cell may be 1:3.

In example embodiments where the fifth code CD5 indicating 1UI information of a unit of a delay cell detected by the unit interval detector 250 is applied to the delay circuit 480 of a unit of the delay unit "D", a delay amount of the delay circuit 480 may be 0.33UI. Considering an additional delay by associated circuits, the delay amount of the delay circuit 480 may exceed 0.33UI and may belong to the range from 0.35UI to 0.6UI described above.

Figure 14:
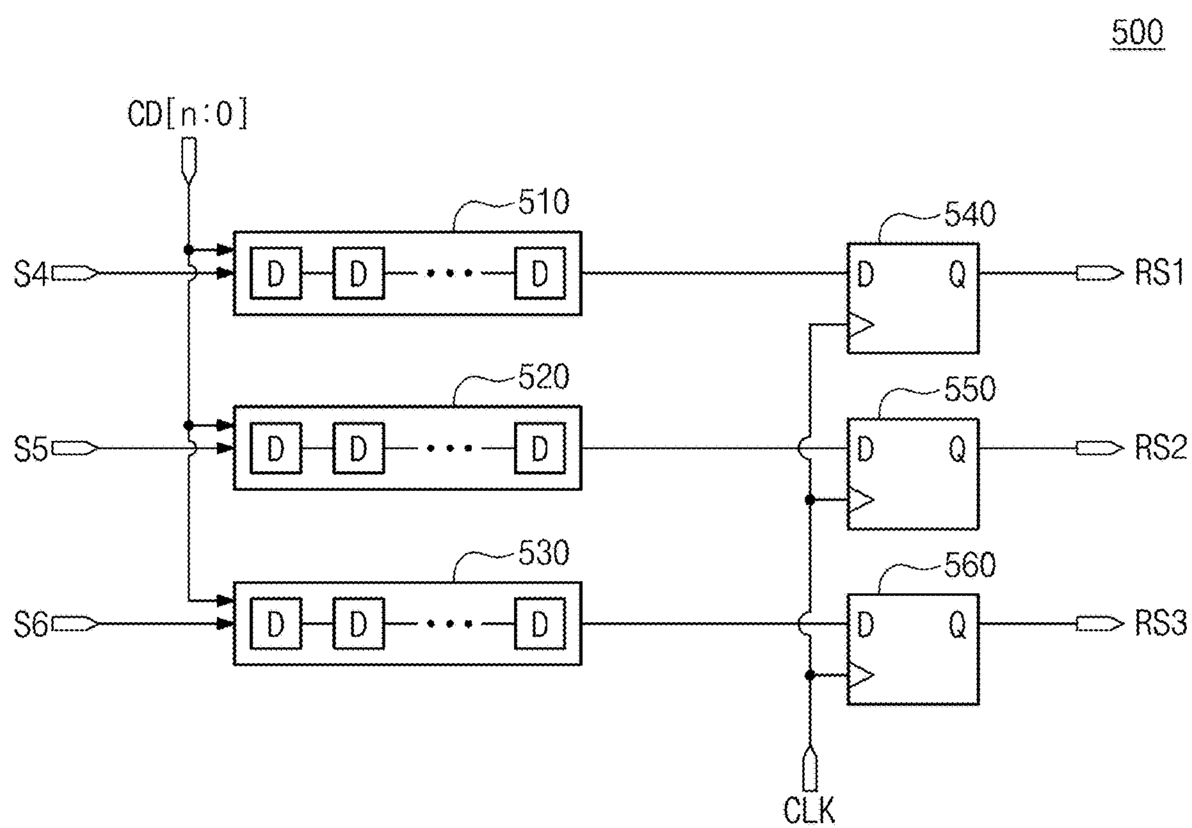
FIG. 14 illustrates a data recovery circuit according to example embodiments of the inventive concepts.

FIG. 14 illustrates a data recovery circuit 500 according to example embodiments of the inventive concepts. The data recovery circuit 500 of FIG. 14 may be included in the data recovery circuit 280 of FIG. 1. Referring to FIGS. 1 and 14, the data recovery circuit 500 may include first, second, and/or third delay circuits 510, 520, and 530 and/or first, second, and/or third flip-flops 540, 550, and 560.

The data recovery circuit 500 may delay the fourth, fifth, and sixth signals S4, S5, and S6 through the first, second, and/or third delay circuits 510, 520, and 530, respectively. Each of the first, second, and/or third delay circuits 510, 520, and 530 may include delay units "D". The first, second, and/or third delay circuits 510, 520, and 530 may delay the fourth, fifth, and/or sixth signals S4, S5, and S6 based on the fifth code CD5, respectively.

The first, second, and/or third delay circuits 510, 520, and 530 may respectively delay the fourth, fifth, and/or sixth signals S4, S5, and S6 as much as a delay amount of delay units "D", the number of which is equal or similar to the number of delay cells indicated by the fifth code CD5. Accordingly, each of the first, second, and/or third delay circuits 510, 520, and 530 may belong to a range from 0.35UI to 0.6UI.

The data recovery circuit 500 may include a logic circuit capable of generating the receive signals RS1, RS2, and RS3. For example, the logic circuit may include the first, second, and/or third flip-flops 540, 550, and 560. The first, second, and/or third flip-flops 540, 550, and 560 may receive the delayed fourth, fifth, and/or sixth signals S4, S5, and S6, respectively. Each of the first, second, and/or third flip-flops 540, 550, and 560 may receive the clock signal CLK from the clock recovery circuit 400.

Each of the first, second, and/or third flip-flops 540, 550, and 560 may operate in response to the clock signal CLK (e.g., in response to a first edge of the clock signal CLK). For example, the first, second, and/or third flip-flops 540, 550, and 560 may respectively latch the delayed fourth, fifth, and/or sixth signals S4, S5, and S6 in response to the clock signal CLK. As a result of the latch operation, the first, second, and/or third flip-flops 540, 550, and 560 may output the first, second, and/or third receive signals RS1, RS2, and RS3, respectively.

As described with reference to FIG. 13, the rising edge of the clock signal CLK is aligned with a start time point of the unit interval UI. In the data recovery circuit 500, each of the fourth, fifth, and/or sixth signals S4, S5, and S6 may be delayed as much as a delay amount belonging to the range from 0.35UI to 0.6UI.

For example, as described with reference to FIG. 13, a delay amount of 0.33UI may be secured by adjusting a delay amount of a unit of the delay unit "D" by using the fifth code CD5 indicating 1UI of a unit of a delay cell. Due to an additional delay of associated circuits, each of a delay amount of the first, second, and/or third delay circuits 510, 520, and 530 may belong to the range from 0.35UI to 0.6UI.

Accordingly, the edge of the clock signal CLK may be aligned within a stable interval, not a change interval of the delayed fourth, fifth, and/or sixth signals S4, S5, and S6, and the first, second, and/or third receive signals RS1, RS2, and RS3 may be successfully latched.

Figure 15:
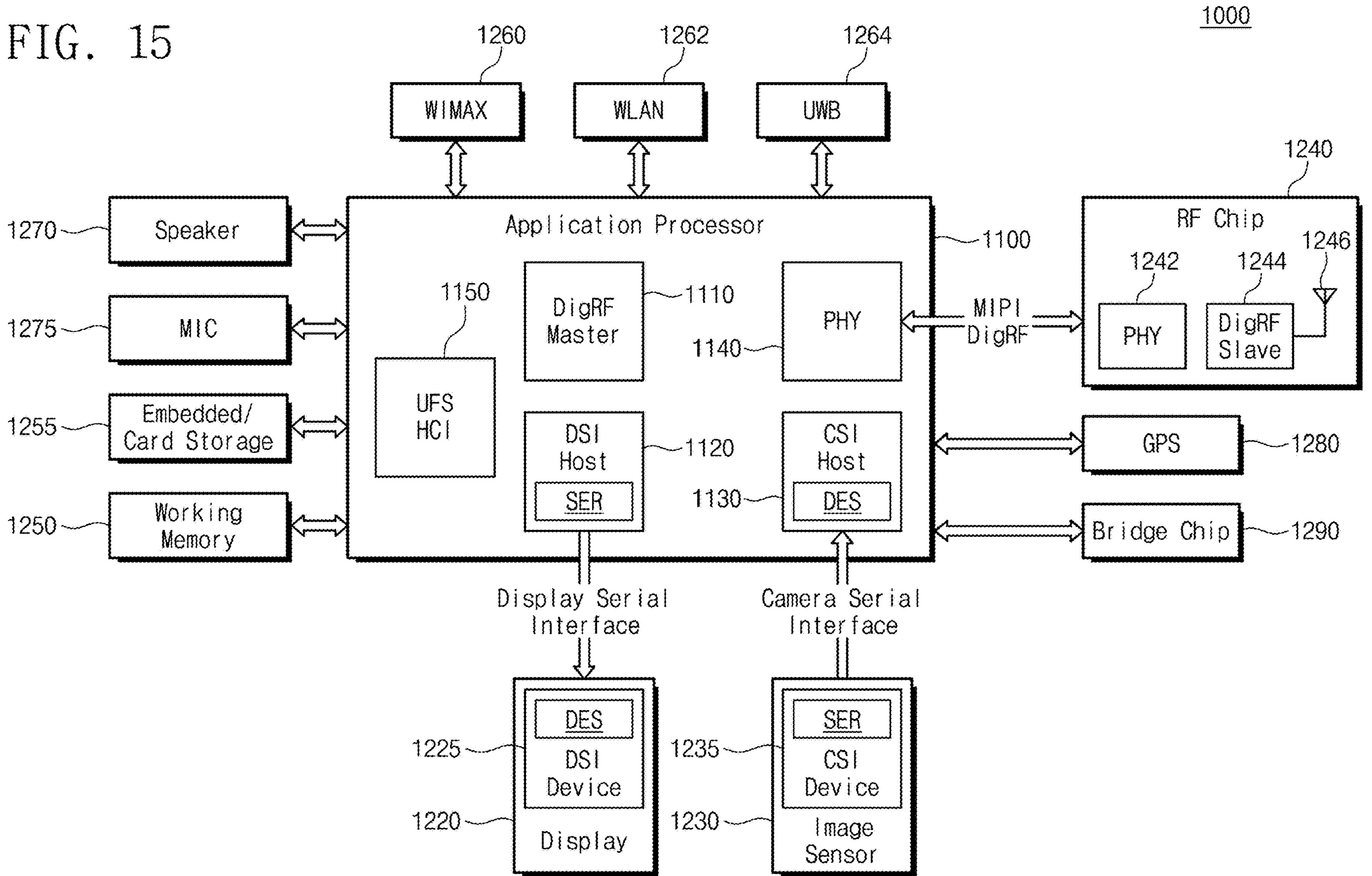
FIG. 15 is a block diagram illustrating an electronic device according to example embodiments of the inventive concepts.

FIG. 15 illustrates an electronic device 1000 according to example embodiments of the inventive concepts. The electronic device 1000 may be implemented with a data processing device that is capable of using or supporting an interface protocol proposed by the MIN alliance. For example, the electronic device 1000 may be one of electronic devices such as a portable communication terminal, a personal digital assistant (PDA), a portable media player (PMP), a smartphone, a tablet computer, and a wearable device.

The electronic device 1000 may include an application processor 1100, a display 1220, and an image sensor 1230. The application processor 1100 may include a DigRF master 1110, a display serial interface (DSI) host 1120, a camera serial interface (CSI) host 1130, a physical layer 1140, and/or a universal flash storage host-controller interface (UFS HCI) 1150.

The DSI host 1120 may communicate with a DSI device 1225 of the display 1220 in compliance with the DSI. For example, a serializer SER may be implemented in the DSI host 1120, and a deserializer DES may be implemented in the DSI device 1225. For example, the DSI may use a physical layer that is defined in the C-PHY specification, and the DSI host 1120 may communicate with the DSI device 1225 through three or more communication lines.

The CSI host 1130 may communicate with a CSI device 1235 of the image sensor 1230 in compliance with the CSI. For example, a deserializer DES may be implemented in the CSI host 1130, and a serializer SER may be implemented in the CSI device 1235. For example, the CSI may use a physical layer that is defined in the C-PHY specification, and the CSI host 1130 may communicate with the CSI device 1235 through three or more communication lines.

The electronic device 1000 may further include a radio frequency (RF) chip 1240 that communicates with the application processor 1100. The RF chip 1240 may include a physical layer 1242, a DigRF slave 1244, and/or an antenna 1246. For example, the physical layer 1242 of the RF chip 1240 and the physical layer 1140 of the application processor 1100 may exchange data with each other in compliance with a DigRF interface proposed by the MIPI alliance.

The electronic device 1000 may further include a working memory 1250 and an embedded/card storage device 1255. The working memory 1250 may temporarily store data processed or to be processed by the application processor 1100. The working memory 1250 may include a volatile memory such as a static random access memory (SRAM), a dynamic RAM (DRAM), or a synchronous DRAM (SDRAM), and/or a nonvolatile memory such as a flash memory, a phase-change RAM (PRAM), a magneto-resistive RAM (MRAM), a resistive RAM (ReRAM), or a ferroelectric RAM (FRAM).

The embedded/card storage device 1255 may store data provided from the application processor 1100 or may provide the stored data to the application processor 1100. The embedded/card storage device 1255 may include a nonvolatile memory that stores data regardless of whether a power is supplied thereto.

For example, the embedded/card storage device 1255 may communicate with the application processor 1100 in compliance with the UFS communication protocol. In this example, the application processor 1100 may process communication with the embedded/card storage device 1255 through the UFS HCI 1150.

The electronic device 1000 may communicate with an external device/system through communication modules, such as a worldwide interoperability for microwave access (WiMAX) 1260, a wireless local area network (WLAN) 1262, and an ultra-wideband (UWB) 1264. The electronic device 1000 may further include a speaker 1270 and a microphone 1275, which are used to process voice information. The electronic device 1000 may further include a global positioning system (GPS) device 1280 for processing position information. The electronic device 1000 may further include a bridge chip 1290 for managing connection with peripheral devices.

In the above example embodiments, components according to the inventive concepts are described by using the terms "first", "second", "third", and the like. However, the terms "first", "second", "third", and the like may be used to distinguish components from each other and do not limit the inventive concepts. For example, the terms "first", "second", "third", and the like do not involve an order or a numerical meaning of any form.

In the above example embodiments, components according to example embodiments of the inventive concepts are described by using blocks. The blocks may be implemented as processing circuitry with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to the inventive concepts, time lengths of intervals between transition timings of received signals are detected, and a difference between the time lengths of the intervals decreases by adjusting delay amounts of the received signals. Accordingly, an electronic device capable of detecting and calibrating a skew and an operating method of the electronic device are provided.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. An electronic device comprising:

processing circuitry configured to receive a signal of a first signal line and a signal of a second signal line and to output a difference between the signal of the first signal line and the signal of the second signal line as a first signal;

receive the signal of the second signal line and a signal of a third signal line and to output a difference between the signal of the second signal line and the signal of the third signal line as a second signal;

receive the signal of the third signal line and the signal of the first signal line and to output a difference between the signal of the third signal line and the signal of the first signal line as a third signal;

adjust a first delay amount in response to a first code, and output a fourth signal by delaying the first signal as much as the first delay amount;

adjust a second delay amount in response to a second code, and output a fifth signal by delaying the second signal as much as the second delay amount;

adjust a third delay amount in response to a third code, and output a sixth signal by delaying the third signal as much as the third delay amount;

generate a pulse signal based on the fourth signal, the fifth signal, and the sixth signal;

detect lengths of intervals of the pulse signal, which have a high level, and to output fourth codes indicating the lengths of the intervals, respectively; and adjust at least one of the first code, the second code, and the third code based on the fourth codes.

2. The electronic device of claim 1, wherein the processing circuitry is further configured to:

generate a seventh signal by performing an exclusive NOR operation on the fourth signal and the fifth signal;

generate an eighth signal by performing an exclusive NOR operation on the fifth signal and the sixth signal; and generate a ninth signal by performing an exclusive NOR operation on the sixth signal and the fourth signal.

3. The electronic device of claim 2, wherein the processing circuitry is further configured to sequentially output the seventh signal, the eighth signal, and the ninth signal.

4. The electronic device of claim 3, wherein the processing circuitry is further configured such that the intervals having the high level are output at least twice, when one of the seventh signal, the eighth signal, and the ninth signal is output.

5. The electronic device of claim 3, wherein the processing circuitry is further configured to output one of the seventh signal, the eighth signal, and the ninth signal during a time belonging to a range of 6 to 12 unit intervals.

6. The electronic device of claim 1, wherein the processing circuitry is further configured to output, as the pulse signal, a first pulse signal having the high level when the fourth signal and the fifth signal are at a low level, a second pulse signal having the high level when the fifth signal and the sixth signal are at the low level, and a third pulse signal having the high level when the sixth signal and the fourth signal are at the low level.

7. The electronic device of claim 6, wherein the processing circuitry is further configured to receive a first length of an interval of the high level of the first pulse signal, a second length of an interval of the high level of the second pulse signal, and a third length of an interval of the high level of the third pulse signal from a detector through the fourth codes.

8. The electronic device of claim 7, wherein the processing circuitry is further configured to:

detect a first difference between lengths, which respectively correspond to a middle length and a short length smaller than the middle length, from among the first length, the second length, and the third length and a second difference between lengths, which respectively correspond to the middle length and a long length greater than the middle length, from among the first length, the second length, and the third length; and calculate a third difference being an average of the first difference and the second difference.

9. The electronic device of claim 8, wherein, in terms of a clockwise direction of the first length, the second length, and the third length, when the clockwise direction is a direction facing the long length from the short length through the middle length, the processing circuitry is configured to adjust a corresponding code of the first code, the second code, and the third code so as to delay a signal not associated with the middle length from among the first signal, the second signal, and the third signal as much as the third difference.

10. The electronic device of claim 8, wherein, in terms of a clockwise direction of the first length, the second length, and the third length, when the clockwise direction is a direction facing the short length from the long length through the middle length, the processing circuitry is configured to adjust corresponding codes of the first code, the second code, and the third code so as to delay signals associated with the middle length from among the first signal, the second signal, and the third signal as much as the third difference.

11. The electronic device of claim 8, wherein the processing circuitry is further configured to adjust the at least one of the first code, the second code, and the third code based on the third difference, and wherein, until at least one of the first difference, the second difference, and the third difference becomes smaller than a threshold, the processing circuitry is further configured to repeat detecting the first difference, the second difference, and the third difference and adjusting the at least one of the first code, the second code, and the third code.

12. The electronic device of claim 1, wherein the processing circuitry is further configured to:

receive the fourth signal, the fifth signal, and the sixth signal, to receive a fifth code, and to recover a clock signal from the fourth signal, the fifth signal, and the sixth signal by using the fifth code, wherein, after adjusting the at least one of the first code, the second code, and the third code, the processing circuitry is further configured to receive the fifth code indicating the lengths of the intervals and to provide the fifth code.

13. The electronic device of claim 1, wherein the processing circuitry is further configured to receive the fourth signal, the fifth signal, and the sixth signal, to receive a fifth code, and to recover a clock signal from the fourth signal, the fifth signal, and the sixth signal by using the fifth code, wherein, after adjusting the at least one of the first code, the second code, and the third code, the processing circuitry is further configured to allow a detector to output the fifth code indicating the lengths of the intervals to a clock recovery circuit.

14. The electronic device of claim 1, wherein the processing circuitry is further configured to recover a clock signal from the fourth signal, the fifth signal, and the sixth signal; and receive the fourth signal, the fifth signal, and the sixth signal, to receive the clock signal, and to recover a first receive signal, a second receive signal, and a third receive signal from the fourth signal, the fifth signal, and the sixth signal by using the fifth code and the clock signal, wherein, after adjusting the at least one of the first code, the second code, and the third code, the processing circuitry is further configured to receive the fifth code indicating the lengths of the intervals and to provide the fifth code.

15. The electronic device of claim 1, wherein the processing circuitry is further configured to recover a clock signal from the fourth signal, the fifth signal, and the sixth signal; and receive the fourth signal, the fifth signal, and the sixth signal, to receive a fifth code, to receive the clock signal, and to recover a first receive signal, a second receive signal, and a third receive signal from the fourth signal, the fifth signal, and the sixth signal by using the fifth code and the clock signal, wherein, after adjusting the at least one of the first code, the second code, and the third code, the processing circuitry is further configured to allow a detector to output the fifth code indicating the lengths of the intervals.

16. An electronic device comprising:

processing circuitry configured to output a first signal, a second signal, and a third signal;

detect differences of time lengths of intervals between transition timings of the first signal, the second signal, and the third signal and to generate a fourth signal, a fifth signal, and a sixth signal by delaying at least one of the first signal, the second signal, and the third signal such that the differences of the time lengths decrease, while the first signal, the second signal, and the third signal alternately transition during a preamble interval; and recover a clock signal, and a first receive signal, a second receive signal, and a third receive signal by using the fourth signal, the fifth signal, and the sixth signal.

17. The electronic device of claim 16, wherein the processing circuitry is further configured to:

perform an exclusive NOR operation on two signals of the first signal, the second signal, and the third signal to generate a pulse signal; and detect a corresponding one of the differences of the time lengths by detecting a width of the pulse signal.

18. The electronic device of claim 16, wherein the processing circuitry is further configured to select the at least one signal targeted for a delay from among the first signal, the second signal, and the third signal along a direction in which the differences of the time lengths vary.

19. An operating method of an electronic device, comprising:

receiving a first signal, a second signal, and a third signal alternately transitioning in a preamble interval;

detecting unit intervals between two transition timings being the closest in time from among transition timings of the first signal, the second signal, and the third signal;

performing skew calibration by delaying at least one of the first signal, the second signal, and the third signal by using the unit intervals;

recovering a clock signal from the first signal, the second signal, and the third signal, after the skew calibration is completed; and recovering data from the first signal, the second signal, and the third signal, by using the clock signal.

20. The operating method of claim 19, wherein the performing of the skew calibration includes:

delaying at least one of the first signal, the second signal, and the third signal such that differences between the unit intervals decrease.

* * * * *

UNITED STATES PATENT AND TRADEMARK OFFICE

CERTIFICATE OF CORRECTION

PATENT NO. : 11,070,350 B1
APPLICATION NO. : 16/990068
DATED : July 20, 2021
INVENTOR(S) : Woongki Min It is certified that error appears in the above-identified patent and that said Letters Patent is hereby corrected as shown below:

In the Claims

Claim 7 should read:
7. The electronic device of claim 6, wherein the processing circuitry is further configured to receive a first length of an interval of the high level of the first pulse signal, a second length of an interval of the high level of the second pulse signal, and a third length of an interval of the high level of the third pulse signal through the fourth codes.

Claim 13 should read:
13. The electronic device of claim 1, wherein the processing circuitry is further configured to receive the fourth signal, the fifth signal, and the sixth signal, to receive a fifth code, and to recover a clock signal from the fourth signal, the fifth signal, and the sixth signal by using the fifth code, wherein, after adjusting the at least one of the first code, the second code, and the third code, the processing circuitry is further configured to output the fifth code indicating the lengths of the intervals.

Claim 15 should read:
15. The electronic device of claim 1, wherein the processing circuitry is further configured to recover a clock signal from the fourth signal, the fifth signal, and the sixth signal; and receive the fourth signal, the fifth signal, and the sixth signal, to receive a fifth code, to receive the clock signal, and to recover a first receive signal, a second receive signal, and a third receive signal from the fourth Signed and Sealed this
Fourth Day of June, 2024

Katherine Kelly Vidal

Katherine Kelly Vidal
*Director of the United States Patent and Trademark Office* signal, the fifth signal, and the sixth signal by using the fifth code and the clock signal, wherein, after adjusting the at least one of the first code, the second code, and the third code, the processing circuitry is further configured to output the fifth code indicating the lengths of the intervals.